S. C. SWANN.
REEL ACTUATING DEVICE FOR CAMERAS AND THE LIKE.
APPLICATION FILED NOV. 29, 1916.
1,394,048.
Patented Oct. 18, 1921.
2 SHEETS—SHEET 2.
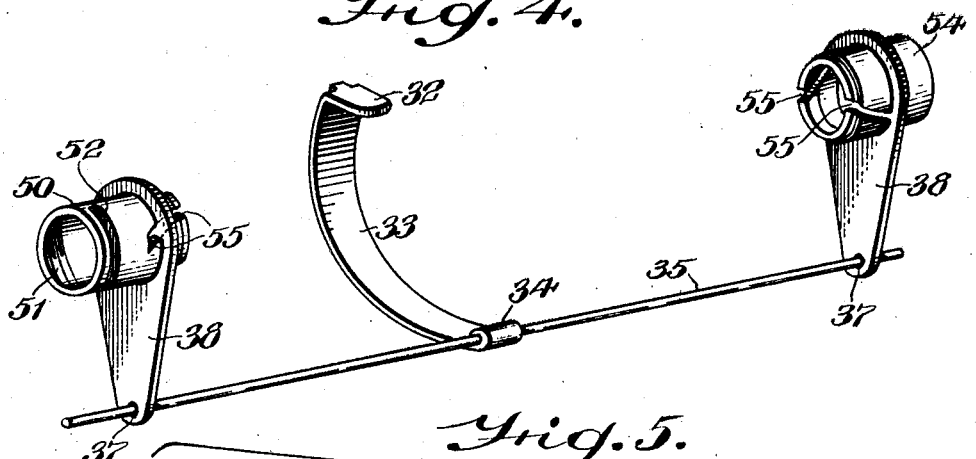
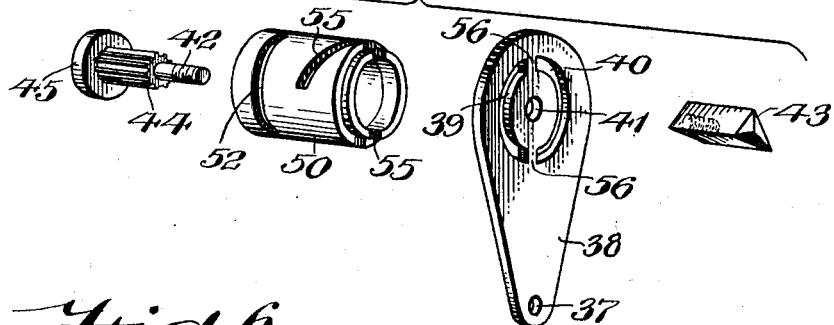
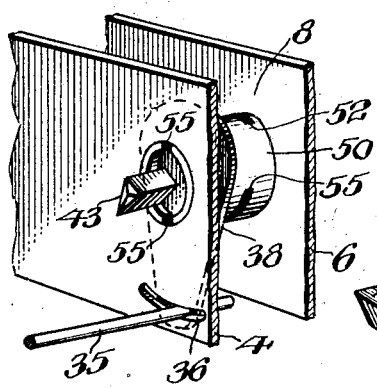
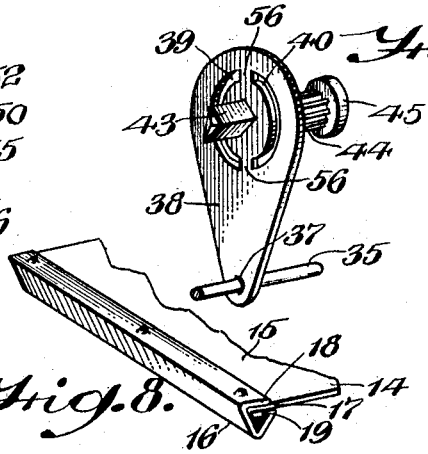
INVENTOR
Sydney C. Swann
BY
ATTORNEYS

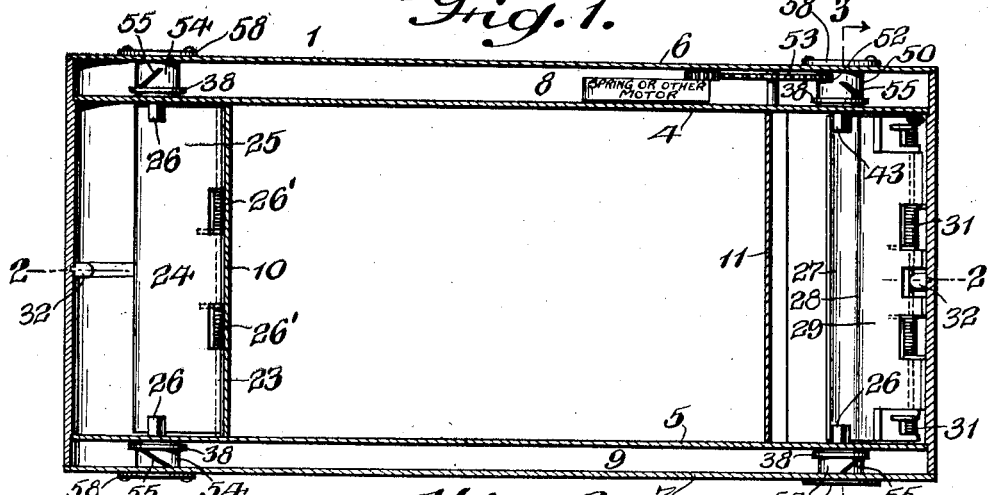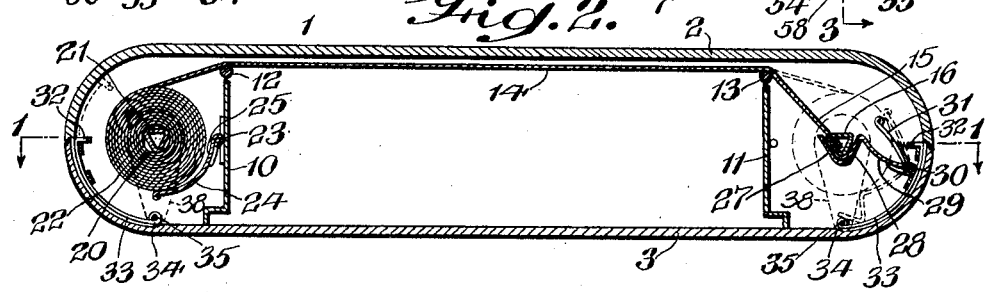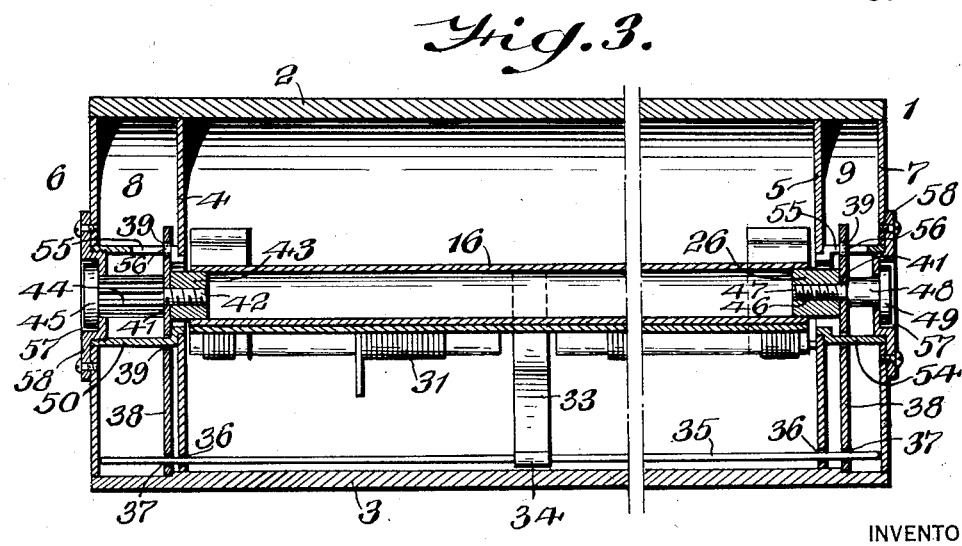

UNITED STATES PATENT OFFICE.

SYDNEY C. SWANN, OF RICHMOND, VIRGINIA, ASSIGNOR TO EASTMAN KODAK COMPANY, OF ROCHESTER, NEW YORK, A CORPORATION OF NEW YORK.

REEL-ACTUATING DEVICE FOR CAMERAS AND THE LIKE.

1,394,048.      Specification of Letters Patent.      Patented Oct. 18, 1921.

Original application filed March 15, 1916, Serial No. 84,320. Divided and this application filed November 29, 1916. Serial No. 134,100.

*To all whom it may concern:*

Be it known that I, SYDNEY C. SWANN, a citizen of the United States, residing at Richmond, in the county of Henrico, State of Virginia, have invented a new and useful Reel-Actuating Device for Cameras and the like, of which the following is a specification.

It has heretofore generally been the practice in loading and unloading cameras, to operate the same in substantially the following manner:—

The spool from which the film has been unwound is removed from the center which supports what is ordinarily called the "feed spool," and is placed in a reverse position on the center which supports what is ordinarily called the "winding spool," and the roll is adjusted upon the feed center to properly position it. The film paper is then drawn across the exposed face of the camera and the end of the film laboriously inserted into an elongated slot in the winding spool. This film must be accurately centered or it will pull unevenly, as is obvious. It is then necessary to turn the finger key several times before putting on the back of the camera. After the camera is closed, the winding must be continued until such time as the warning signal on the film indicates that the film is near position for exposure, and constant vigilance must be used to prevent the film from passing this point.

Each successive exposure requires the same careful manipulation of the film. After the last exposure is made, the hand winding is continued until previous experience or the operator's judgment indicates that it is probably safe to remove the back of the camera. When this is done, the camera must be put upon a suitable table or other support and one hand used to produce a tension on the paper while the other hand winds to the end.

It is furthermore impossible to release the tension until a gummed sticker is put over the end of the roll of the film. Then it is necessary to remove the center and release the roll, after which it must be removed or ejected from its pocket by any suitable means, but usually by upsetting or turning upside down or reversing the camera.

In my novel invention, I have devised a novel reel, reel center and reel actuating mechanism for dispensing with the foregoing steps in the manner described, which are usually employed in connection with existing forms of cameras now in use, it being unnecessary in adapting my device to camera casings of the conventional type, to change to any extent the exterior contour or casing of the camera, so that my invention is readily applicable to camera casings of the standard types and sizes now in use.

Furthermore, in my device I make no change whatever in the film, but secure a three-sided or other polygonal center or reel to the starting end of the roll, by inserting the end of said film between longitudinally extending juxtaposed lips on said reel, said polygonal reel forming the double function both of a reel and center for the film or roll, and being made of any suitable material, such as paper, paste-board, fiber, metal or other suitable material, and while said reel is preferably made hollow, it can be made solid, if desired, and either the hollow or solid construction can be perforated, if desired.

It will be seen from the foregoing that in my device I eliminate various parts of the camera reels and centers heretofore employed, and have produced a novel device, which is simpler, more efficient and economical and less liable to get out of order, and I am further enabled in my device to eliminate the slow and uncertain processes of manipulation now employed to insert a new film or roll, and to advance the same, as desired.

I furthermore am enabled by my device to propel the film automatically, and I also am enabled to finally remove said film or roll after it has been entirely used, from the camera, with greater expedition than heretofore, by means of a novel manual manipulation, which can be readily effected by any unskilled operator.

In a contemporaneously pending application filed by me on the 15th day of March, 1916, Serial No. 84,320, of which the present invention in its broad aspects is a division, I have shown, described and broadly claimed a novel construction of camera and a reeling and unreeling device therefor, upon which my present invention is an improvement in various particulars, one of which relates particularly to the provision of a novel construction of a preferably polygonal center, which is detachably secured to a body portion provided with a pinion, said pinion being adapted to normally mesh with or be operated by a gear or a suitable member of a train of gearing, preferably spring-actuated, whereby rotation is imparted to the reel coacting with said specially devised center, the other three centers employed being constructed the same and in substantial accordance with the disclosure in my pending application aforesaid.

To the above ends, my invention consists of a novel reel actuating device and a novel manner of assembling and collocating my novel reel center with respect to its actuating mechanism, whereby a simultaneous outward or inward movement of a pair of centers is effected.

It further consists of a novel construction of a reel center having a polygonal end portion, and a body portion attached thereto and provided with a pinion.

For the purpose of illustrating my invention, I have shown in the accompanying drawings certain embodiments thereof which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a sectional view on line 1—1, Fig. 2, of a camera and its adjuncts embodying my invention, the reels and film being removed therefrom.

Fig. 2 represents a section on line 2—2 Fig. 1, showing the inner reel and the outer reel carrying the film or strip of material in assembled position with respect to their respective tension carriages.

Fig. 3 represents on an enlarged scale, a section on line 3—3 Fig. 1.

Fig. 4 represents on an enlarged scale a perspective view of the manually-operated device for simultaneously operating the reel or film centers.

Fig. 5 represents a perspective view of the parts composing my novel reel center in detached position, showing also in perspective the hub or cam sleeve and the arm coacting therewith.

Fig. 6 represents a perspective view showing the center, rock arm, hub and the supports therefor in assembled position.

Fig. 7 represents a perspective view of the center in assembled position with respect to the rock arm.

Fig. 8 represents a perspective view of one of the reels employed, in detached position.

Fig. 9 represents a perspective view of one of the three reel centers which I employ, showing the parts in detached position. Similar numerals of reference indicate corresponding parts.

Referring to the drawings:—

1 designates my novel construction of camera, the same comprising an outer casing, which may be of any usual or conventional character or construction, being, if desired, of a flat rectangular shape, having round or square ends and provided with a top detachable member 2, which may be fastened in position to the base member 3 by means of any of the spring catches or locking devices now generally employed.

4 and 5 designate the inner side walls of the camera, the same being contained within the outer side walls 6 and 7 respectively, whereby the longitudinally extending chambers 8 and 9 respectively will be formed between said walls 4 and 6 and 5 and 7, as will be understood from Figs. 1 and 3.

10 designates a partition at the left of the camera, and 11 designates a partition at the right thereof, said partitions 10 and 11 having the rollers 12 and 13 located in proximity thereto, said rollers being preferably freely revoluble upon a suitable axis and having the strip or film 14 traveling over them.

The manner of mounting or supporting the roll or film 14 will be apparent from Fig. 2, and is the same as already described in my contemporaneously pending application aforesaid, the starting end 15 of the film being secured within the polygonal-shaped reel or center 16, as seen in Figs. 2 and 8, by having its terminal 17 introduced between the juxtaposed walls 18 and 19 of said reel, as will be understood from the right-hand portion of Fig. 2 and from Fig. 8. The reel 16 which I preferably employ is shown in the present instance, as best seen in Figs. 2 and 8, as a hollow polygonal body, which may be composed of card-board, paste-board, fiber, metal or any other similar material.

The manner of assembling the starting end of the film 14 with respect to the outer or starting polygonal reel 16 will be understood from the right-hand of Fig. 2, the inner end of the film or strip, as indicated at about the point 20, being detachably secured to the inner reel 21 in the manner shown in Fig. 8, or if desired, the inner terminal of said film may be merely wound around said inner reel 21, but disconnected therefrom, so that when the film 14 has been used on its last exposure, the inner end 20 thereof can be readily unreeled from said inner reel 21. It will be understood that the film 14 comes from the manufacturer or source of supply wound on the inner reel 21 and having the outer reel attached thereto in the manner described with respect to Figs. 2 and 8, and in order to load the camera or to place the film in position, it is only necessary to remove the top 2 of the camera and drop the left-hand roll or reeled film 22 upon the left-hand tension carriage 24, which is pivotally supported at 23, as will be understood from the left-hand portion of Figs. 1 and 2, said tension carriage comprising a curved plate having the concave longitudinal seat 25, which receives said roll or reeled film 22.

The detailed construction of the tension carriage *per se* forms no part of the present invention, as the same has already been described and claimed in my contemporaneously pending application aforesaid, it being, however, essential that said tension carriage be provided with springs or tension devices, as indicated at 26', so that the carriage is caused to exert pressure from the bottom upwardly against the reel or roll 22 as the same is unwound, and its diameter becomes reduced, said tension carriage contacting with said roll at all times and thereby compensating for the reduction in diameter of the roll during the unwinding or unreeling of the film.

It will be apparent from the foregoing that the roll 22 of the film upon being placed in position, as indicated at the left of Fig. 2, will depress somewhat the tension carriage 24, as shown in the left of said figure, and the operator can now unreel or unroll the strip or film sufficiently until the starting reel 16 can assume the position seen at the right of Fig. 2, it being, however, understood that the inner reel 21 has been previously rotatably mounted in position with respect to its centers 26, as will be hereinafter described, and as the manner of mounting and centering the inner reel 21 and the outer or starting reel 16 at each end of the camera is substantially identical, the description of the operation of one pair of centers will suffice for both.

The film or strip 14 having been unrolled or unreeled sufficiently, as above explained, to permit the starting reel 16 to be dropped into the position seen at the right-hand of Fig. 2, it will be apparent that said reel 16 is received in a longitudinally extending V or similar shaped seat, which is composed of the V-shaped or diverging walls 27 and 28, the latter wall being attached to or depending from the right tension carriage 29, which is composed of a trough-shaped member pivotally supported at 30 and provided with suitable springs or tension devices 31, whereby as the film or strip of material is wound upon the reel 16, the tension carriage will be depressed downwardly and will accommodate itself to the gradually increasing diameter of said reeled film or other material.

In the construction seen at the right of Fig. 2, it will be understood that the reel seat formed by the inclined walls 27 and 28 is in its extreme highest position, said uppermost or highest position of the right-hand tension carriage being assured by means of the tension devices 31.

The general construction of the reels and tension carriages is substantially the same as that described and broadly claimed in my contemporaneously pending application aforesaid and need not be referred to in greater detail.

Referring now to Figs. 1, 2 and 4, 32 designates a finger piece, which projects inwardly and laterally from the upper end of the curved bar 33, which carries at its lower extremity 34 a transversely extending rod 35, whose outer ends are guided in the curved slots 36 of the partitions 4 and 5, as seen in Figs. 3 and 6, the outer portions of said rod 35 passing through the holes 37 in the lower extremities of the rock arms 38, whose upper portions are provided with the curved slots 39 and 40.

41 designates an opening in the upper portion of each of the rock arms 38, through which loosely passes the threaded portion 42 of the polygonal center 43, said center being longitudinally tapped to receive the threaded stem 42 and the latter having attached thereto an enlarged hub provided with the pinion or gear 44, which terminates in the head 45, as will be understood from the left-hand portion of Fig. 3, and from Figs. 5 and 7.

It will be understood that only the single center seen at the upper right-hand portion of Fig. 1 and at the left-hand portion of Fig. 3 is constructed in the manner described as regards the pinion 44, the other three centers 26 being constructed as seen in Fig. 9, wherein the polygonal center proper is indicated at 26 having the threaded hole 46 therein, which is engaged by the threaded stem 47, which projects from the rounded body portion 48, provided with the head 49.

The construction of the centers 26 will be readily understood from the right-hand portion of Fig. 3 and from Fig. 9.

While I have shown the reels 21 and 16 as being preferably of triangular shape in cross-section, it will be understood that the same may be of other polygonal shape in cross section, and that in order to coöperate with the triangular openings in the ends of the reels 21 and 16, I have shown the centers 26 and 43 as being triangular in cross-section, but it will of course be understood that in case I employ a polygonal shaped center of different contour, as a rectangle, the contour of the coacting centers will be correspondingly changed.

50 designates the cam sleeve seen at the upper right-hand end of Fig. 1, at the left of Figs. 3 and 4, and in Fig. 5 which incloses the center 43, said cam sleeve being provided with a slot 52 in the side thereof, to permit the entrance of the gear 53, in order that the latter may mesh with the pinion 44 which is contained within said cam sleeve 50, the other three cam sleeves 54 being unprovided with any slots as 52. All four of the cam sleeves are, however, provided with the inclined cam slots 55, which extend in opposite directions, as will be understood from the right-hand portion of Fig. 4, it being apparent that when the arms 38 are assembled upon the cam sleeves, the solid portions 56 between the terminals of the cam slots 39 and 40 upon being engaged with said cam slots 55, will produce a device which when assembled will appear substantially as seen in Figs. 3 and 4 and that the oscillation of the transverse rod 35 upon a depression of the finger piece 32 will cause an oscillation of the rock arms 38, which by reason of their engagement with the stationary cam sleeves will cause the arms 38, centers connected thereby and their adjuncts to move simultaneously inwardly or outwardly on a horizontal line. The manner of the interlocking of the upper portions of the oscillatory rock arms 38 with the stationary cam sleeves will be readily understood from the ends of Fig. 3 and from Figs. 4, 5 and 6, it being understood that the cam sleeve 50 seen at the upper right-hand portion of Fig. 1 and the three other cam sleeves 54 are suitably mounted between the walls 5 and 7 and 4 and 6 and said arms 38 are capable of readily rotating thereon. The oscillation of said arms 38 readily effects the simultaneous outward and inward movement of each pair of centers 26 and 26 or 43 and 26 according to requirements.

As already explained, it will be understood that the three centers 26 are all constructed as seen in Fig. 9, while the center 43 is constructed as seen in Figs. 5 and 7, it being only necessary that one of said centers as 43, be in communication with the driving mechanism or gear, as 53.

It will be understood that the gear 53 may be intermittently or automatically actuated from any suitable source of energy or prime motor as a spring motor or the like, one form of such prime motor being shown in my contemporaneously pending application aforesaid, but I do not desire to be limited thereto, as any form of motive power or means for initially imparting intermittent or automatic rotation to the gear 53, pinion 44 and its centers 43 can be employed, as may be desired.

The operation is as follows:—

When the parts are in the position seen in Fig. 2, the finger piece 32 and the centers 26 seen at the left of Fig. 1 are in substantially the position seen in full lines in Fig. 2. When it is desired to cause the centers 26 to move outwardly, the finger piece 32 is moved upwardly into the position indicated in dotted lines in Fig. 2, whereupon the centers are moved outwardly from the position seen in Fig. 1 and are out of engagement with the ends of the inner reel 21. In this position, the reel can be inserted or replaced and upon inserting the reel so that its ends are in alinement with the centers 26, it is only necessary to depress the finger piece 32 until the same assumes a position seen in full lines in Fig. 2, in which position the centers appear as seen in Fig. 1.

The operation of the right-hand center 43 and its juxtaposed alining center 26 seen in Fig. 1, is the same as already described, it being apparent that when the right-hand finger piece 32 is in the position seen at the right of Fig. 2, the center 43 and its alining center 26 will be in the position seen in the right of Fig. 1.

When it is desired to cause the pair of centers 43 and 26 to become disengaged from the ends of the reel 16 it is only necessary to exert an upward pull upon the finger piece 32, whereupon said centers will be withdrawn from the ends of the reel 16 and the latter can be removed and a new one placed in position, according to requirements.

It will be seen that the actuation of the gear 53, which is mounted on a suitable shaft, will positively actuate the pinion 44, the center 43 and the coacting reel 16, the actuation of said reel effecting the unreeling of the strip of material 14, as is evident. The heads of the center as 45 and 49 can be received or located in the depressed portions 57 of the closures 58, said closures having openings therethrough permitting the body portion of the centers to be rotatably mounted therein.

It will now be apparent that I have devised a novel and useful construction of a reel actuating device for cameras and the like, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a reeling device, a center adapted to engage the end of a reel, a pinion carried by said center and rotatable in unison therewith, means for rotating said pinion and center, a cam sleeve surrounding a portion of said center, and means coacting with said cam sleeve to actuate said center in a longitudinal direction.

2. In a reeling device, a threaded stem having a pinion on an extension thereof, a center of polygonal contour having a threaded seat engaged by said stem, said pinion, center and stem rotating in unison, a cam sleeve surrounding a portion of said center, and means coacting with said cam sleeve to actuate said center in a longitudinal direction.

3. In a reeling device, centers polygonally shaped in cross-section, a pinion carried by one of said centers and rotatable in unison therewith, means for rotating said pinion, a reel having polygonal openings in its ends, which are engaged by a pair of said centers, cam sleeves surrounding a portion of said centers, and means coacting with said cam sleeves to actuate said pair of centers longitudinally into and out of engagement with said reel.

4. In a reeling device, a pair of centers polygonally shaped in cross section, a pinion carried by one of said centers, means for rotating said pinion and center, a polygonal reel rotatably supported having a polygonal opening in each of its ends, said openings being engaged by said centers, a slotted cam sleeve surrounding a portion of each of said centers, and means coacting with said cam sleeves to actuate said centers toward and away from the ends of said reel.

5. In a reeling device, a pair of centers polygonally shaped in cross-section, a pinion detachably connected with one of said centers, means for rotating said pinion and its center as a unit, a cam sleeve surrounding a portion of each center and having an oblique slot therein, and means coacting with said slots and cam sleeves to actuate said centers toward and away from said reel.

6. In a reeling device, a pair of reel centers polygonally shaped in cross-section, a pinion mounted on one of said centers, means for rotating said pinion, cam sleeves surrounding a portion of said centers, arms depending from said cam sleeves, a transverse rod joining said arms, and a finger piece connected to said rod for actuating said rod, arms and cam stems in unison to cause said centers to be simultaneously moved away from and toward each other.

7. In a reeling device, a pair of centers polygonally shaped in cross-section, a reel also polygonally shaped in cross-section having its ends engaged by said centers, a pinion mounted on one of said centers, means for rotating said pinion, cam sleeves surrounding a portion of said centers and having oblique slots therein, and means coacting with said slots in said cam sleeves to simultaneously actuate said centers.

8. In a device of the character stated, a casing, stationary sleeves supported on said casing and having cam slots therein, arms having means to engage said sleeves and slots, reel centers carried by said arms, means to oscillate said arms, a pinion secured to one of said reel centers, one of said cam sleeves surrounding said pinion and having a slot therein, and a gear extending through said slot and in engagement with the pinion carried by said center.

9. In a camera, a casing, sleeves carried thereby and provided with cam slots, arms having means to enter said slots, a rod passing through said arms, means to move said rod in a curved path, reel centers carried by said arms, a pinion detachably secured to one of said centers, and a gear for rotating said pinion, one of said sleeves inclosing said pinion and being slotted to permit said gear to mesh with said pinion.

SYDNEY C. SWANN.

Witnesses:
F. E. SOHRE,
C. L. DROSTY.

It is hereby certified that in Letters Patent No. 1,394,048, granted October 18, 1921, upon the application of Sydney C. Swann, of Richmond, Virginia, for an improvement in "Reel-Actuating Devices for Cameras and the like," errors appear in the printed specification requiring correction as follows: Page 5, after line 45, insert the following as claim 6:

6. *In a camera, the combination of a pair of centers, polygonally shaped in cross-section, a pinion mounted on one of said centers, cam sleeves surrounding a portion of said centers and supported in said camera, means coacting with said cam sleeves to simultaneously move said centers away from or towards each other, the sleeve surrounding said pinion having a slot therein, and a gear entering said slot and in mesh with said pinion for rotating said pinion and center.;* same page, lines 46, 57, 67, and 78, for claim numbers "6," "7," "8," and "9" read *7, 8, 9,* and *10;* and that the said Letters Patent should be read with these corrections therein that the same may conform to the record of the case in the Patent Office.

Signed and sealed this 13th day of December, A. D., 1921.

[SEAL.]

KARL FENNING,
*Acting Commissioner of Patents.*